United States Patent [19]

Gibbs

[11] Patent Number: 5,143,603
[45] Date of Patent: Sep. 1, 1992

[54] APPARATUS AND SYSTEM FOR REMOVING LOW DENSITY LIQUIDS FROM OIL PRODUCTION WATER TANKS

[75] Inventor: Paul C. Gibbs, Big Spring, Tex.

[73] Assignee: Mobil Oil Corporation, Fairfax, Va.

[21] Appl. No.: 705,476

[22] Filed: May 24, 1991

[51] Int. Cl.$^5$ .............................................. C02F 1/40
[52] U.S. Cl. ................................ 210/122; 210/138; 210/242.3; 210/540
[58] Field of Search ............... 210/122, 138, 242.1, 210/242.3, 540, 923

[56] References Cited

U.S. PATENT DOCUMENTS

| 836,335 | 11/1906 | Nichols | 210/242.1 |
| 1,107,391 | 8/1914 | Welch et al. | 210/242.3 |
| 1,450,545 | 4/1923 | Hans | 210/122 |
| 2,010,363 | 8/1935 | Hine | 210/242.1 |
| 3,616,923 | 11/1971 | Haley | 210/242.3 |
| 3,679,771 | 7/1972 | McKee | 210/242.3 |
| 3,702,134 | 11/1972 | Henning, Jr. et al. | 210/242.3 |
| 3,875,056 | 4/1975 | Inglis | 210/138 |
| 4,132,645 | 1/1979 | Bottomley et al. | 210/104 |
| 4,431,536 | 2/1984 | Thompson | 210/123 |
| 4,597,863 | 7/1986 | Rymal, Jr. | 210/117 |
| 4,851,133 | 7/1989 | Rymal | 210/776 |
| 4,892,666 | 1/1990 | Paulson et al. | 210/776 |
| 4,986,903 | 1/1991 | Canzoneri et al. | 210/138 |
| 5,030,342 | 7/1991 | Ortega | 210/122 |

FOREIGN PATENT DOCUMENTS 140828 8/1901 Fed. Rep. of Germany.
5245770 4/1977 Japan.

Primary Examiner—Stanley S. Silverman
Assistant Examiner—Christopher Upton
Attorney, Agent, or Firm—Alexander J. McKillop; Charles J. Speciale; Michael J. Mlotkowski

[57] ABSTRACT

An apparatus for removing low density liquids from oil production water tanks. The apparatus includes a vertically disposed elongated hollow base member having an upper end and a lower end, the base member having at least two radially spaced mounting bosses affixed in a horizontal plane thereto at a distance between the upper and lower ends of the base member; a plug mounted at the upper end of the base member; a hollow inlet member having a first end and a second end, the first end mounted to the lower end of the base member, the inlet member further having a substantially horizontally disposed fluid inlet in fluid communication with at least the second end of the inlet member; at least two substantially horizontally disposed arms, the arms each having a first end and a second end, the first end of each being mounted to the radially spaced mounting bosses of the base member; at least two hollow float members each of the float members having a connecting boss mounted thereon, the connecting bosses of the float members connected to the second end of the arms; and an elongated flexible tubular member having a first end and a second end, the first end in fluid communication with the second end of the hollow inlet member.

19 Claims, 2 Drawing Sheets

APPARATUS AND SYSTEM FOR REMOVING LOW DENSITY LIQUIDS FROM OIL PRODUCTION WATER TANKS

FIELD OF THE INVENTION

The present invention relates to the recovery of oil from a subterranean oil-bearing formation. More particularly, the present invention relates to an improved waterflooding operation employing an apparatus and method for removing low density liquids from oil production water tanks used in such secondary recovery operations.

BACKGROUND OF THE INVENTION

In the recovery of crude oil from subterranean formations, large quantities of oil will generally remain in the formation when production relies solely upon primary depletion, i.e., where only initial formation energy is used to recover the oil. Where the initial formation energy is inadequate or has become depleted, supplemental operations are employed, such operations commonly referred to as secondary recovery operations. In certain of these supplemental recovery operations, a fluid is injected through at least one well, called an injection well, and passed into the formation. The oil is moved through the formation and is produced from another well, called a production well, as the injected fluid passes from the injection well toward the production well.

One of the most widely used secondary recovery operations is waterflooding, wherein water is the fluid passed through the formation. As is well to those skilled in the art, waterflooding operations often employ the use of thickening agents, surfactants and other additives to further increase the recovery of oil.

The cost of processing the water used in waterflooding operations is directly borne by any increased oil production resulting therefrom. In situations where disposal is necessary, there is no compensation for handling the water and the disposal costs are a direct levy against the gross profits from oil production. Waste water has, at best, only minor value and its proper handling is imperative to avoid contamination of surface or underground water. In view of these and other factors, waterflooding operations generally employ recycled produced waters, such waters often better characterized as brines. These brines, which may contain a few hundred to several hundred thousand parts per million of dissolved solids, may be sweet or sour and may be saturated with calcium sulfate, calcium carbonate, and other salts. In systems employing recycled produced water, the water is generally collected in a central storage tank from several batteries, and is often injected back into the formation through a common injection station.

As may be appreciated by those skilled in the art, it is common to have some degree of oil carry-over into water tankage when produced water is used in the waterflooding operation. The same is true for any tankage used to store produced waters for any purpose. Moreover, the cost of the waterflooding operation itself increases proportionally to the amount of produced oil sent back into the ground as part of the waterflooding operation. Additionally, other produced materials, such as iron sulfide, preferentially reside within the produced oil. Should such iron sulfide containing oil be pumped back into the injection well with the injection water, the likelihood of damage to pumps and related equipment increases.

Therefore, what is needed is an economical apparatus and system for the recovery of low density liquids from oil production water tanks.

SUMMARY OF THE INVENTION

In accordance with the present invention, there is provided an apparatus for removing low density liquids from oil production water tanks. The apparatus includes a vertically disposed elongated hollow base member having an upper end and a lower end, the base member having at least two radially spaced mounting bosses affixed in a horizontal plane thereto at a distance between the upper and lower ends of the base member; a plug mounted at the upper end of the base member; a hollow inlet member having a first end and a second end, the first end mounted to the lower end of the base member, the inlet member further having a substantially horizontally disposed fluid inlet in fluid communication with at least the second end of the inlet member; at least two substantially horizontally disposed arms, the arms each having a first end and a second end, the first end of each being mounted to the radially spaced mounting bosses of the base member; at least two hollow float members each of the float members having a connecting boss mounted thereon, the connecting bosses of the float members connected to the second end of the arms; and an elongated flexible tubular member having a first end and a second end, the first end in fluid communication with the second end of the hollow inlet member.

Also provided is a system for the removal of low density liquids from oil production water tanks, comprising (a) an apparatus for skimming low density liquids from a position near the surface level of the low density liquid, the apparatus including: (i) a vertically disposed elongated hollow base member having an upper end and a lower end, the base member having at least two radially spaced mounting bosses affixed in a horizontal plane thereto at a distance between the upper and lower ends of the base member; (ii) a plug mounted at the upper end of the base member; (iii) a hollow inlet member having a first end and a second end, the first end mounted to the lower end of the base member, the inlet member further having a substantially horizontally disposed fluid inlet in fluid communication with at least the second end of the inlet member; (iv) at least two substantially horizontally disposed arms, the arms each having a first end and a second end, the first end of each being mounted to the radially spaced mounting bosses of the base member; and (v) at least two hollow float members each of the float members having a connecting boss mounted thereon, the connecting bosses of the float members connected to the second end of the arms; (b) an elongated flexible tubular member having a first end and a second end, the first end in fluid communication with the second end of the hollow inlet member; (c) means for supplying a pressure below atmospheric pressure to the second end of the elongated flexible tubular member; and (d) means for initiating the supply of below atmospheric pressure to the elongated flexible tubular member.

Therefore it is a object of the present invention to provide an apparatus and system for removing low density liquids from oil production water tanks.

It is another object of the present invention to provide an apparatus and system for removing low density liquids from oil production water tanks which operates irrespective of the height of high density material in the tank.

It is a further object of the present invention to provide an economical apparatus and system for removing low density liquids from oil production water tanks.

Other objects and the several advantages of the present invention will become apparent to those skilled in the art upon a reading of the specification and the claims appended thereto.

BRIEF DESCRIPTION OF THE DRAWINGS

Reference may now be had to the following detailed description of an exemplary embodiment of the inventive apparatus and system, taken in conjunction with the accompanying drawings, in which.

DETAILED DESCRIPTION OF THE INVENTION

The present invention is best understood by reference to the appended figures, which are given by way of example and not of limitation.

Figure 1:
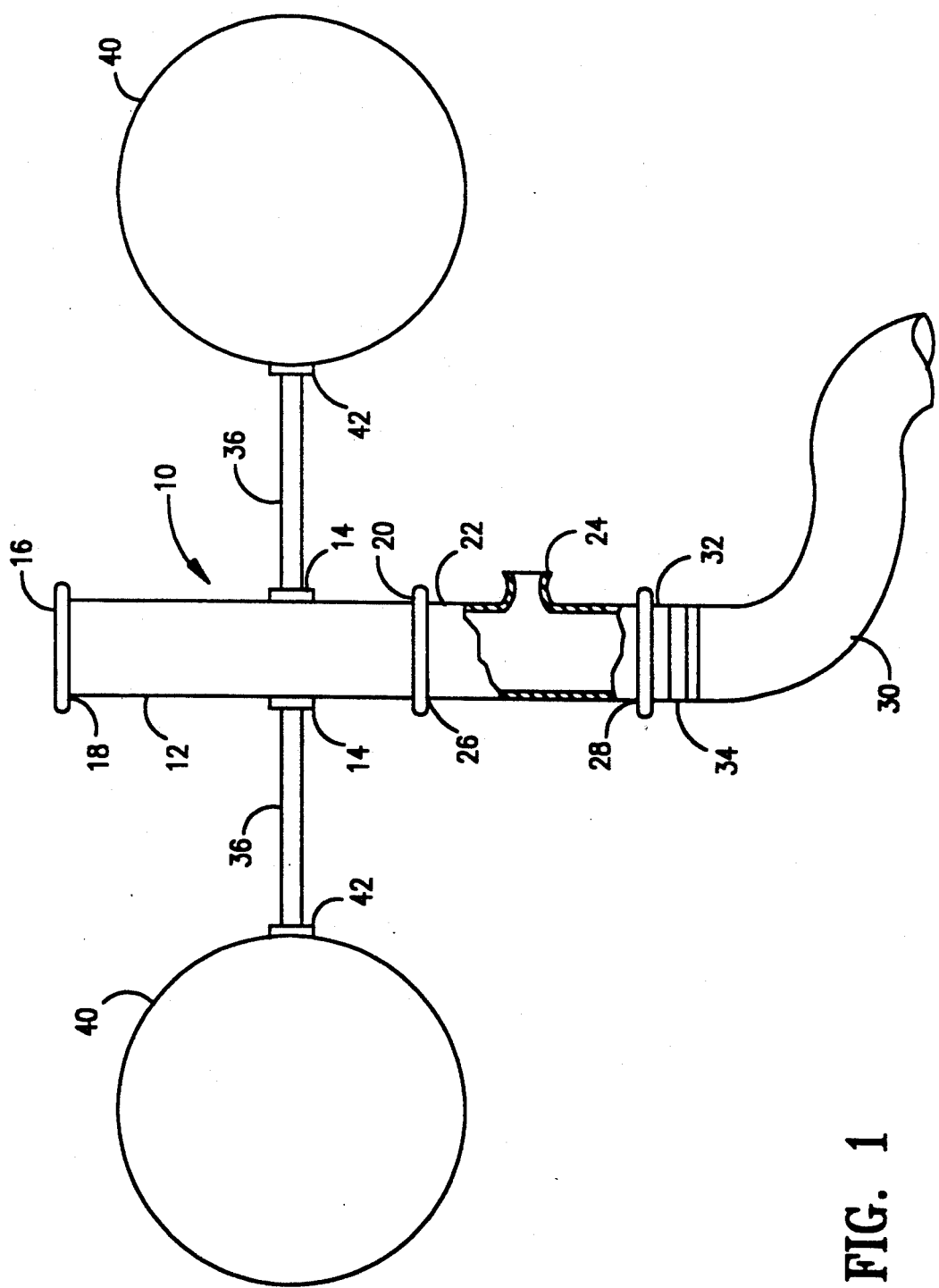
FIG. 1 presents an embodiment of an apparatus for removing low density liquids from oil production water tanks, according to the present invention.

Referring now to FIG. 1, an embodiment of an apparatus for removing low density liquids from oil production water tanks, in accordance with the present invention, is shown. The apparatus 10 includes a vertically disposed elongated hollow base member 12 having an upper end 18 and a lower end 20. Preferred for use in forming base member 12 is a grooved hollow nipple, the size of which is selected on the basis of the water facility tankage. Materials preferred for use include carbon steel, plastic coated steel, nickel coated steel, monel, polyvinyl chloride (PVC) and stainless steel, with 316 stainless steel being particularly preferred from the standpoint of corrosion resistance. In most production water facility tankage, a 2" diameter by 12" long nipple will be found to be adequate. Base member 12 is shown having two radially spaced mounting bosses 14 affixed in a horizontal plane at a distance between upper end 18 and lower end 20 of base member 12. Bosses 14 may be $\frac{3}{4}$" stainless steel collars which are welded to base member 12. Mounted at upper end 18 of base member 12 is plug 16. Plug 16, as is preferred, may be a grooved plug sized in accordance with the dimensions of base member 12. Plug 16 may be nickel coated for corrosion resistance.

Mounted to the lower end 20 of base member 12 is a hollow inlet member 22. As is preferred, inlet member 22 may be a grooved tee, sized in accordance with the dimensions of base member 12. Again, materials preferred for use include carbon steel, plastic coated steel, nickel coated steel, monel, polyvinyl chloride (PVC) and stainless steel, with 316 stainless steel again being particularly preferred from the standpoint of corrosion resistance. For most production water facility tankage, a 2" diameter by 6" long tee is suitable. Inlet member 22 has a first end 26 and a second end 28, the first end 22 mounted to the lower end 20 of base member 12. As may be seen, inlet member 22 has a substantially horizontally disposed fluid inlet 24 in fluid communication with the second end 28 of inlet member 22.

As may be appreciated by those skilled in the art, in order to permit apparatus 10 to remove or skim low density fluid from a tank in which stratified fluids of differing densities reside, apparatus 10 must be positioned within a tank so that fluid inlet 24 is positioned within the low density fluid. This positioning is advantageously achieved by providing apparatus 10 with floatation means. As may be seen by reference to FIG. 1, two substantially horizontally disposed arms 36 are mounted to the radially spaced mounting bosses 14 of base member 12. Affixed to arms 36 are two hollow float members 40, each float member 40 having a connecting boss 42 mounted thereon for connecting to arms 36. Hollow float members 40 may be produced from carbon steel, plastic coated steel, nickel coated steel, monel, polyvinyl chloride (PVC) or stainless steel, with 316 stainless steel being, once again, particularly preferred from the standpoint of corrosion resistance, consistent with many of the other component parts of the apparatus of the present invention. Most preferred for use in the practice of the present invention are spherical stainless steel floats having an outer diameter of 14". Although an apparatus having two spherically shaped float members 40 has been depicted, it is to be understood that three, four or more floats may be employed to provide increased stability and such an apparatus is to be considered to be within the scope of this invention.

Still referring to FIG. 1, an elongated flexible tubular member 30 is shown connected and in fluid communication with the second end 28 of hollow inlet member 22. The connection is made through the use of a hose nipple 32 employing a double band 34 to firmly affix flexible tubular member 30 thereto. Flexible tubular member 30 may be, as is preferred, a rubber or composite hose having a pressure rating of at least about 50 psi, having a diameter sufficient for its purpose.

Figure 2:
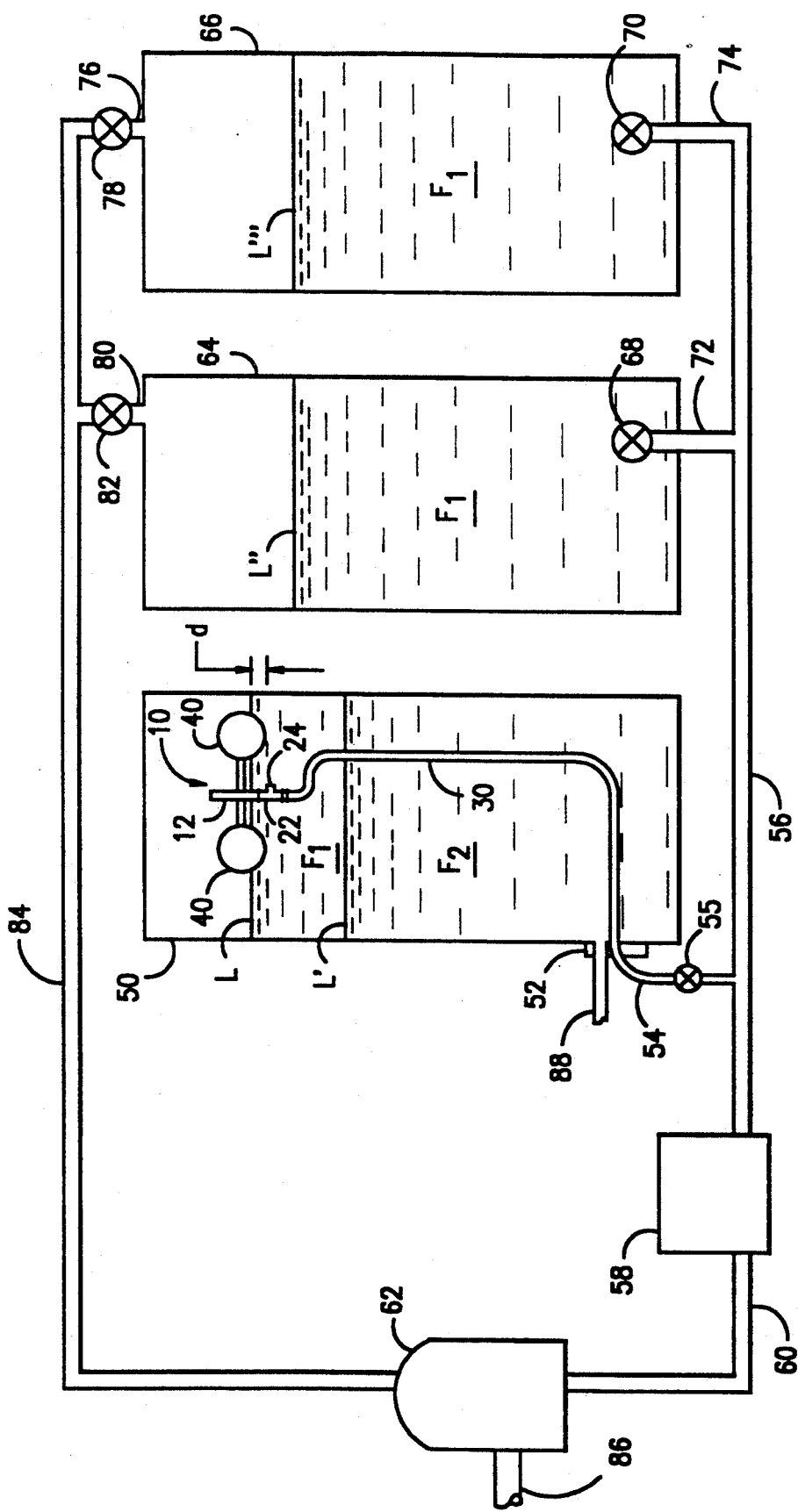
FIG. 2 presents, schematically, a system for removing low density liquids from oil production water tanks, in accordance with the present invention.

Referring now to FIG. 2, a schematic depiction of an illustrative embodiment of a system for removing low density liquids from oil production water tanks is shown, in accordance with the present invention. As may be seen, apparatus 10 is installed in tank 50, tank 50 containing density stratified fluids $F_1$ and $F_2$. The fluid of higher density, $F_2$, fills tank 50 to a level L', while the lower density fluid, $F_1$, which may be oil, a mixture of oil and produced iron sulfide or any low density material, resides on top of fluid $F_2$, the combination of fluids $F_1$ and $F_2$ filling tank 50 to a level of L. Apparatus 10 is shown floating substantially on top of fluid $F_1$, with floats 40 shown partially submerged due to the weight of the apparatus. Fluid inlet 24 is shown submerged a distance, d, below L. Flexible tubular member 30 is shown, as is preferred, to be capable of traversing virtually the entire height of tank 50, providing a broad range of operation. Flexible tubular member 30 is shown terminating at hatch 52, such hatches commonly provided on oil production facility water tanks. Also, located at hatch 52 is water line 88 which may be plumbed to the downhole water injection feed line in a typical arrangement. In fluid communication with flexible tubular member 30 is pipe 54, which, in turn, is in fluid communication with oil pump inlet line 56.

Still referring to FIG. 2, the contents of oil tanks 64 and 66, filled with low density fluid $F_1'$, which may be the same or different fluid from $F_1$, are pumped by pump 58 from those tanks through pipes 72 and 74, respectively, which are in fluid communication with inlet line 56. As shown, the flows through pipes 54, 72 and 74 are controlled by valves 55, 68 and 70, respectively. The pumped material may then go to optional heater/treater 62 and, either be recycled back to tanks 64 and 66 through recycle line 84, or be transferred away from the system for sale or storage elsewhere through line 86. The flows through pipes 76 and 80 are controlled by valves 78 and 82, respectively. As may be seen, apparatus 10 advantageously employs what may be an existing pump and oil treater system present at the production facility to remove the low density fluid $F_1$ from tank 50.

As may be appreciated by those skilled in the art, the operation of the apparatus of the present invention may be enhanced through automation. For example, suction to flexible tubular member 30 may be provided periodically, as needed, for removal of low density material. Initiation can be accomplished through the use of a timer, with deactivation accomplished through the use of a water sensor in the suction line; with more elaborate schemes easily envisioned. Computer or microprocessor control may also be provided to further enhance the operation of the unit.

The present invention is further illustrated by the following non-limiting examples, which are presented for illustrative purposes only, and are not intended to limit the scope of the invention as defined by the appended claims.

EXAMPLE

An apparatus for removing low density liquids from oil production water tanks was fabricated, essentially as described above. The water tank hatch of the tank to receive the unit was removed, a hole drilled therethrough and a 2" by 12" grooved nipple placed through the hole and welded thereto. The end of the flexible hose of the apparatus opposite the end attached to the lower end of the inlet member was attached to the inside portion of the nipple. A suction line from the facility's oil pump was attached to the outside portion of the nipple. The apparatus was placed inside the tank and the hatch bolted in place. The system installation so completed was essentially as shown in FIG. 2.

The water stream from production back to the water tank was initiated. Upon establishment of system liquid levels, the apparatus was turned on and low density material removal initiated.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An apparatus for removing low density liquids from an oil production water tank, comprising:
   (a) a vertically disposed elongated hollow base member having an upper end and a lower end, said base member having at least two radially spaced mounting bosses affixed in a horizontal plane thereto at a distance between said upper and lower ends of said base member;
   (b) a plug mounted at said upper end of said base member;
   (c) a hollow inlet member having a first end and a second end, said first end mounted to said lower end of said base member, said inlet member further having a substantially horizontally disposed fluid inlet in fluid communication with at least said second end of said inlet member;
   (d) at least two substantially horizontally disposed arms, said arms each having a first end and a second end, said first end of each being mounted to said radially spaced mounting bosses of said base member;
   (e) at least two hollow float members each of said float members having a connecting boss mounted thereon, said connecting bosses of said float members connected to said second end of said arms; and
   (f) an elongated flexible tubular member having a first end and a second end, said first end in fluid communication with said second end of said hollow inlet member.

2. The apparatus of claim 1, wherein said elongated flexible tubular member is connected to said second end of said hollow inlet member through the use of a hose nipple employing a double band to firmly affix said flexible tubular member thereto.

3. The apparatus of claim 2, wherein said flexible tubular member is a rubber or composite hose having a pressure rating of at least about 50 psi.

4. The apparatus of claim 3, wherein said hollow float members are spherical.

5. The apparatus of claim 4, wherein said hollow float members are of stainless steel construction.

6. The apparatus of claim 1, wherein said flexible tubular member is a rubber or composite hose having a pressure rating of at least about 50 psi.

7. The apparatus of claim 6, wherein said hollow float members are spherical.

8. The apparatus of claim 1, wherein said hollow float members are spherical.

9. The apparatus of claim 1, wherein said hollow float members are of stainless steel construction.

10. A system for the removal of low density liquids from oil production water tanks, comprising:
   (a) an apparatus for skimming low density liquids from a position near the surface level of the low density liquid, said apparatus including:
      (i) a vertically disposed elongated hollow base member having an upper end and a lower end, said base member having at least two radially spaced mounting bosses affixed in a horizontal plane thereto at a distance between said upper and lower ends of said base member;
      (ii) a plug mounted at said upper end of said base member;
      (iii) a hollow inlet member having a first end and a second end, said first end mounted to said lower end of said base member, said inlet member further having a substantially horizontally disposed fluid inlet in fluid communication with at least said second end of said inlet member;
      (iv) at least two substantially horizontally disposed arms, said arms each having a first end and a second end, said first end of each being mounted to said radially spaced mounting bosses of said base member; and
      (v) at least two hollow float members each of said float members having a connecting boss mounted thereon, said connecting bosses of said float members connected to said second end of said arms;
   (b) an elongated flexible tubular member having a first end and a second end, said first end in fluid communication with said second end of said hollow inlet member;

(c) means for supplying a pressure below atmospheric pressure to said second end of said elongated flexible tubular member; and (d) means for initiating the supply of below atmospheric pressure to said elongated flexible tubular member.

11. The system of claim 10, further comprising means for terminating the supply of below atmospheric pressure to said elongated flexible tubular member.

12. The system of claim 11, wherein said means for initiating the supply of below atmospheric pressure to said elongated flexible tubular member includes a timer.

13. The system of claim 12, wherein said flexible tubular member is a rubber or composite hose having a pressure rating of at least about 50 psi.

14. The system of claim 13, wherein said hollow float members are spherical.

15. The system of claim 14, wherein said hollow float members are of stainless steel construction.

16. The system of claim 11, wherein said flexible tubular member is a rubber or composite hose having a pressure rating of at least about 50 psi.

17. The system of claim 11, wherein said hollow float members are spherical.

18. The system of claim 10, wherein said hollow float members are spherical.

19. The system of claim 10, wherein said hollow float members are of stainless steel construction.

* * * * *